US012618275B2

(12) United States Patent
Shingu et al.

(10) Patent No.: US 12,618,275 B2
(45) Date of Patent: May 5, 2026

(54) LOWER ROLLER

(71) Applicant: Honda Motor Co., Ltd., Tokyo (JP)

(72) Inventors: Hiroshi Shingu, Walled Lake, MI (US); Yuichiro Saiki, Sakura (JP); Joji Goto, Utsunomiya (JP); Takashi Fukahori, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 442 days.

(21) Appl. No.: 18/086,434

(22) Filed: Dec. 21, 2022

(65) Prior Publication Data

US 2024/0209666 A1     Jun. 27, 2024

(51) Int. Cl.
  *E05D 15/06*          (2006.01)
  *B60J 5/04*           (2006.01)
  *B60J 5/06*           (2006.01)
(52) U.S. Cl.
  CPC ........ E05D 15/0665 (2013.01); B60J 5/0468 (2013.01); B60J 5/06 (2013.01); *E05Y 2900/531* (2013.01)
(58) Field of Classification Search
  CPC ............ E05D 15/0665; E05D 15/0678; E05D 15/10–1081; E05D 2015/1018–1097; E05D 2015/1026; E05D 15/101; B60J 5/0468; B60J 5/06
  See application file for complete search history.

(56) References Cited

U.S. PATENT DOCUMENTS

| 786,178 | A | * | 3/1905 | Arble | ................... E05D 15/1002 49/427 |
| 4,129,965 | A | * | 12/1978 | Reynolds | ............ E05D 15/1007 49/220 |
| 4,559,740 | A | * | 12/1985 | Tuchiya | .............. E05D 15/1047 49/223 |
| 7,287,805 | B2 | | 10/2007 | Yamada et al. | |
| 7,708,334 | B2 | | 5/2010 | Yamada et al. | |
| 8,141,297 | B2 | | 3/2012 | Elliott et al. | |
| 8,604,367 | B2 | * | 12/2013 | DeCook | ............. H01H 71/1054 200/43.15 |
| 8,701,348 | B2 | * | 4/2014 | Ito | ....................... E05D 15/0621 49/213 |
| 9,061,570 | B1 | | 6/2015 | Je et al. | |

(Continued)

FOREIGN PATENT DOCUMENTS

| CN | 204126437 U | 1/2015 | |
| DE | 102019118542 A1 | * | 7/2020 | .............. B60J 5/062 |

(Continued)

*Primary Examiner* — Daniel P Cahn
*Assistant Examiner* — Patrick B. Ponciano
(74) *Attorney, Agent, or Firm* — Mark E. Duell; Rankin, Hill & Clark LLP

(57)          ABSTRACT

A roller assembly includes an L-shaped bracket and a support bracket, each having a preformed bend that is greater than ninety degrees, but that when under a load of a sliding side door of a vehicle, is configured to decrease under the load to ninety degrees. The roller assembly also includes a roller arm supported between the L-shaped bracket and the support bracket and extending laterally from the brackets for engaging a rail on the body of the vehicle. A spacer is included between the roller arm and the support bracket, preventing contact between them and thus allowing for decreased friction between them.

20 Claims, 5 Drawing Sheets

(56)         References Cited

U.S. PATENT DOCUMENTS

| | | | |
|---|---|---|---|
| 9,399,388 B2 | 7/2016 | Yasunaga et al. | |
| 9,637,968 B2 | 5/2017 | Guitar et al. | |
| 10,000,962 B2 * | 6/2018 | Berger | E05D 15/00 |
| 10,119,314 B2 | 11/2018 | Urano et al. | |
| 10,480,232 B2 * | 11/2019 | Ishikawa | E05F 15/646 |
| 11,525,293 B2 * | 12/2022 | Yun | E05D 15/1081 |
| 11,913,267 B2 * | 2/2024 | Bettcher, III | E05D 5/062 |
| 12,157,355 B2 * | 12/2024 | Kiryu | B60J 5/06 |
| 2011/0089714 A1 * | 4/2011 | Kitayama | E05D 15/0665 |
| | | | 16/91 |
| 2018/0245392 A1 | 8/2018 | Cousin et al. | |
| 2020/0190880 A1 * | 6/2020 | Yun | E05D 15/101 |
| 2022/0325568 A1 * | 10/2022 | Marega | B60J 5/06 |
| 2025/0058610 A1 * | 2/2025 | Lee | B60J 5/06 |

FOREIGN PATENT DOCUMENTS

| | | | |
|---|---|---|---|
| JP | 4978446 | 7/2012 | |
| WO | WO2011027771 | 3/2011 | |
| WO | WO2015087401 | 6/2015 | |
| WO | WO-2021061072 A1 * | 4/2021 | E05D 15/0608 |

* cited by examiner

LOWER ROLLER

BACKGROUND

Sliding doors are often mounted to a side of a vehicle via a roller assembly and a roller track/rail. The roller assembly includes a roller that is slidably mounted in the rail that is arranged on the vehicle. The roller assembly extends laterally out from the door a distance so as to laterally space the door from the vehicle when the door is moved between the open position and the closed position and inhibit the door from contacting the vehicle during such movement. Sliding doors may be heavy, and thus may exert a downward pressure on the laterally extending roller assembly, causing the roller assembly to flex downward and causing the door to sag down under the effect of gravity. This sagging sliding door may not properly align with the door opening of the vehicle when in the door is in the closed position.

BRIEF DESCRIPTION

According to one aspect, a roller assembly for a sliding side door of a vehicle includes an L-shaped bracket, a support bracket, a roller arm, and a roller. The L-shaped bracket includes a vertically oriented portion and horizontally oriented portion. The vertically oriented portion is configured for connecting to the sliding side door. The support bracket is connected to the L-shaped bracket. The roller arm is arranged between the L-shaped bracket and the support bracket, and is connected at a joint to the L-shaped bracket and the support bracket. The roller is arranged on an end of the roller arm distal from the joint, and is configured to slidably connect to a rail of the vehicle. An angle between the vertically oriented portion and the horizontally oriented portion of the L-shaped bracket is more than 91° when the roller assembly is not under load from the sliding side door. The L-shaped bracket is configured such that the angle between the vertically oriented portion and the horizontally oriented portion of the L-shaped bracket is 90° when the roller assembly is under load from the sliding side door.

According to another aspect, a roller assembly for a sliding side door of a vehicle includes an L-shaped bracket, a support bracket, a roller arm, a roller, and a spacer. The L-shaped bracket includes a vertically oriented portion and horizontally oriented portion. The vertically oriented portion is configured for connecting to the sliding side door. The support bracket is connected to the L-shaped bracket. The roller arm is arranged between the L-shaped bracket and the support bracket, and is connected at a joint to the L-shaped bracket and the support bracket. The roller is arranged on an end of the roller arm distal from the joint, and is configured to slidably connect to a rail of the vehicle. The spacer is arranged between the support bracket and the roller arm and inhibits contact between the support bracket and the roller arm. An angle between the vertically oriented portion and the horizontally oriented portion of the L-shaped bracket is more than 91° when the roller assembly is not under load from the sliding side door. The L-shaped bracket is configured such that the angle between the vertically oriented portion and the horizontally oriented portion of the L-shaped bracket is 90° when the roller assembly is under load from the sliding side door According to another aspect, a method includes providing a roller assembly including an L-shaped bracket including a vertically oriented portion and horizontally oriented portion, a support bracket connected to the L-shaped bracket, a roller arm arranged between the L-shaped bracket and the support bracket, and connected at a joint to the L-shaped bracket and the support bracket, and a roller arranged on an end of the roller arm distal from the joint. The method includes using the roller assembly to slidably connect a door to a vehicle such that the door can slide between a closed position covering a door opening of the vehicle, and an open position not covering the door opening. An angle between the vertically oriented portion and the horizontally oriented portion of the L-shaped bracket is more than 91° before the roller assembly is used to slidably connect the door to the vehicle. The angle between the vertically oriented portion and the horizontally oriented portion of the L-shaped bracket is 90° after the roller assembly is used to slidably connect the door to the vehicle.

DETAILED DESCRIPTION

The present subject matter provides a roller assembly for a sliding side door of a vehicle. The roller assembly includes an "overbend," which is a bend having an angle of greater than 90° between two portions on opposite sides of the bend. When the roller assembly is connected to the door and to the vehicle, such that the roller assembly supports the load (weight) of the door, the angle is reduced to a subsequent angle of 90°. The formation of the roller assembly with this initial bend angle of greater than 90° inhibits deflection of the roller assembly to a subsequent angle of less than 90° when bearing the load of the door, and thus inhibits sagging of the door and the associated misalignment of the door with the door opening in the vehicle. The L-shaped bracket may be configured such that the subsequent angle between the vertically oriented portion and the horizontally oriented portion of the L-shaped bracket is 90° when the roller assembly is under the load from the sliding side door.

Figure 1:
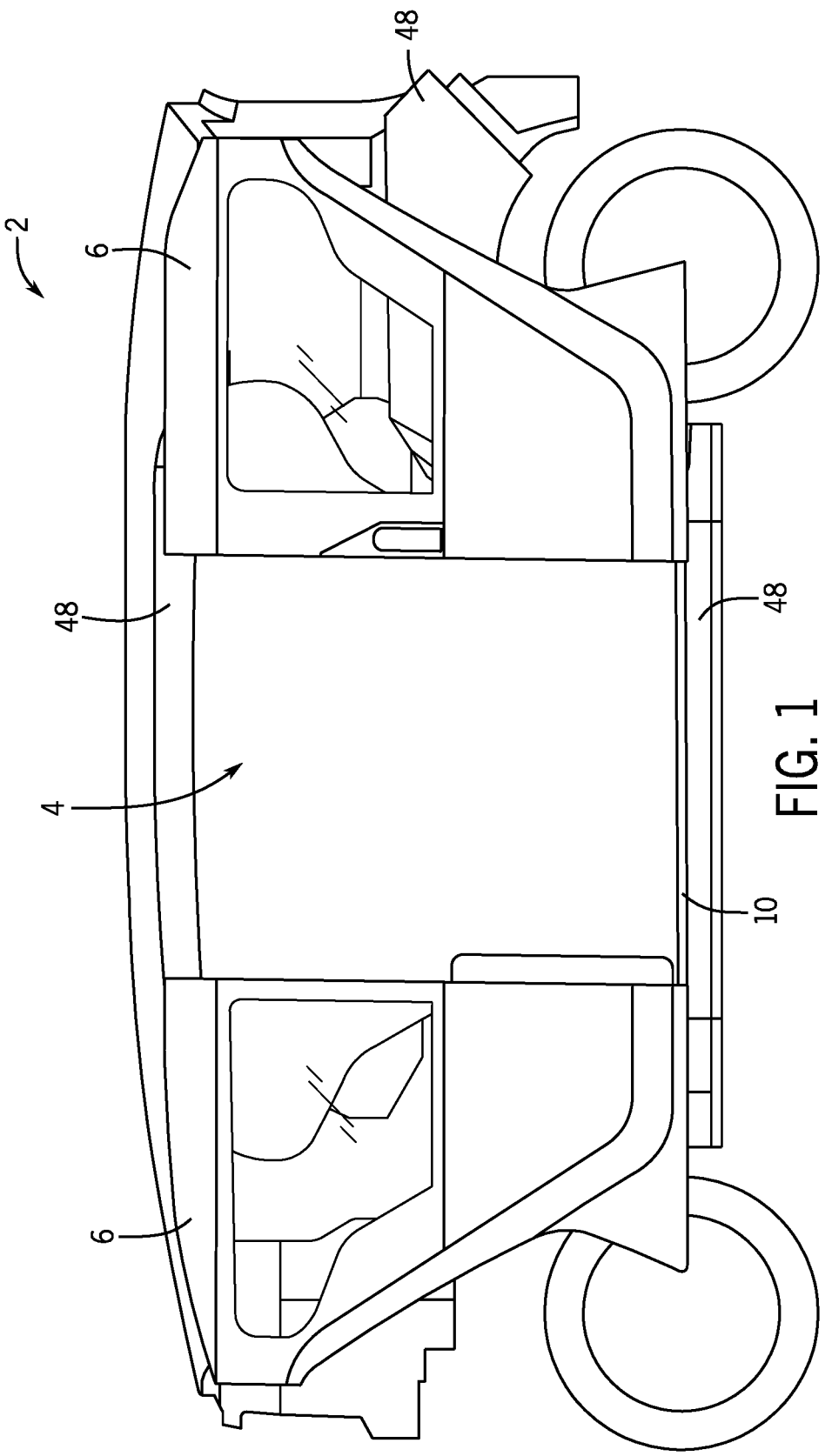
FIG. 1 is a side view of a vehicle including two sliding side doors in an open position according to the present subject matter.
Figure 2:
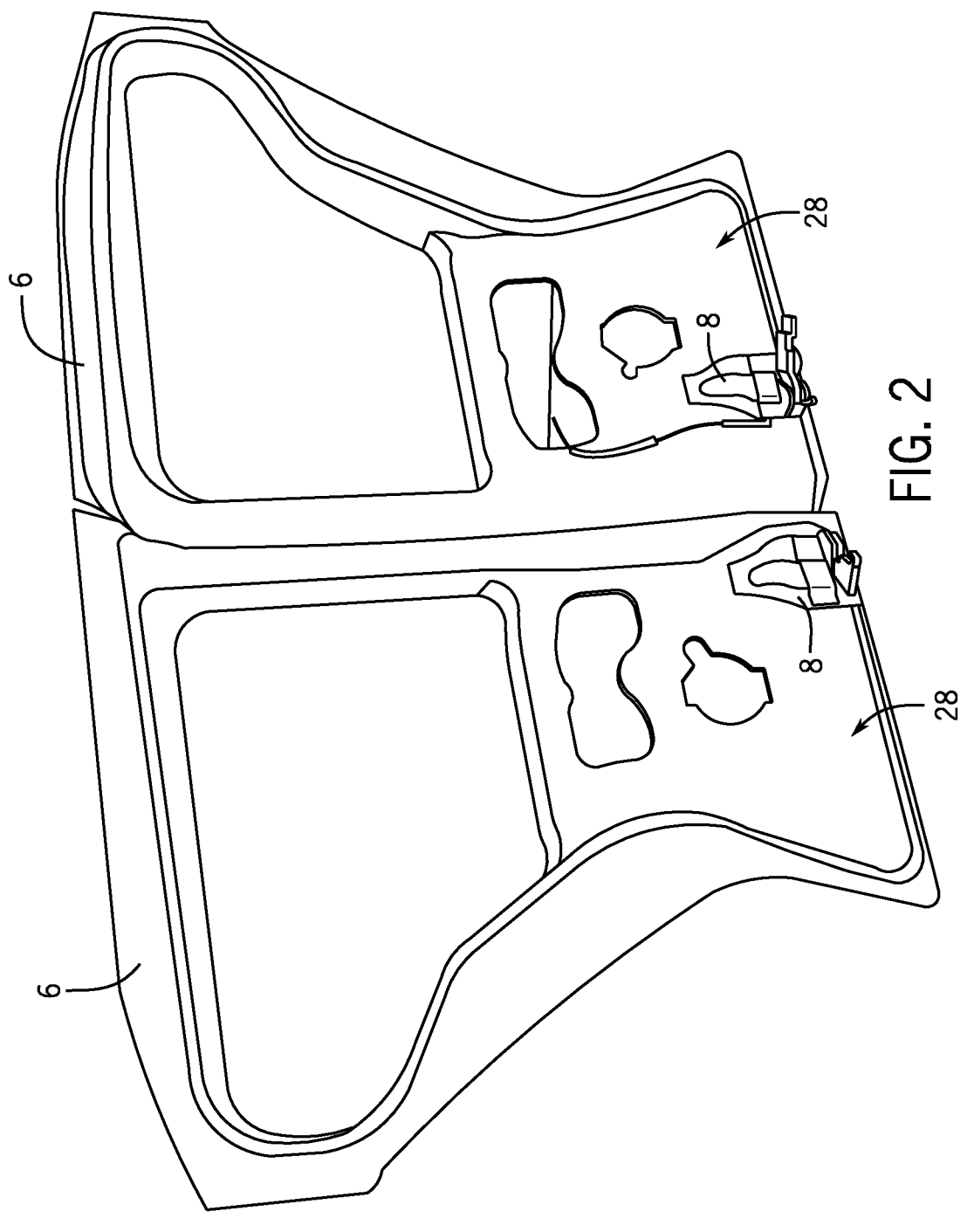
FIG. 2 is a perspective view of the two sliding side doors of FIG. 1 in a closed position and including lower roller assemblies.
Figures 3, 4:
FIG. 3 is a perspective view of a roller assembly according to the present subject matter.
FIG. 4 is a side view of the roller assembly of FIG. 3.
Figure 5:
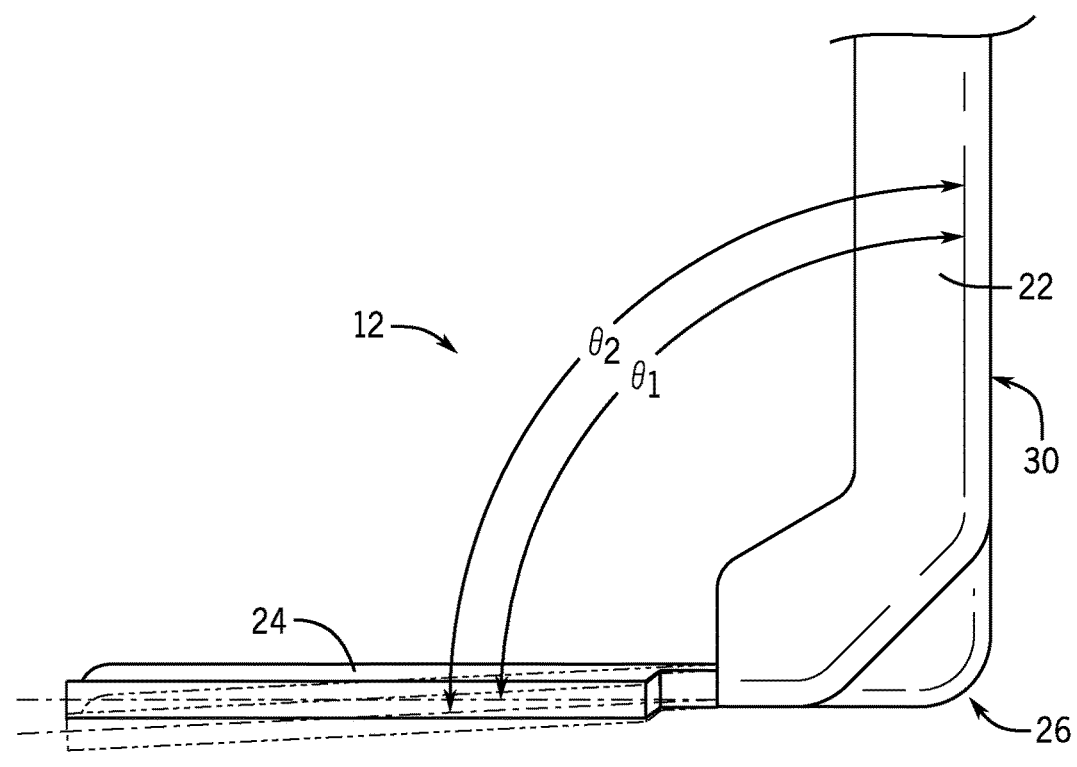
FIG. 5 is a side view showing deflection of an L-shaped bracket of the roller assembly according to the present subject matter.
Figure 6:
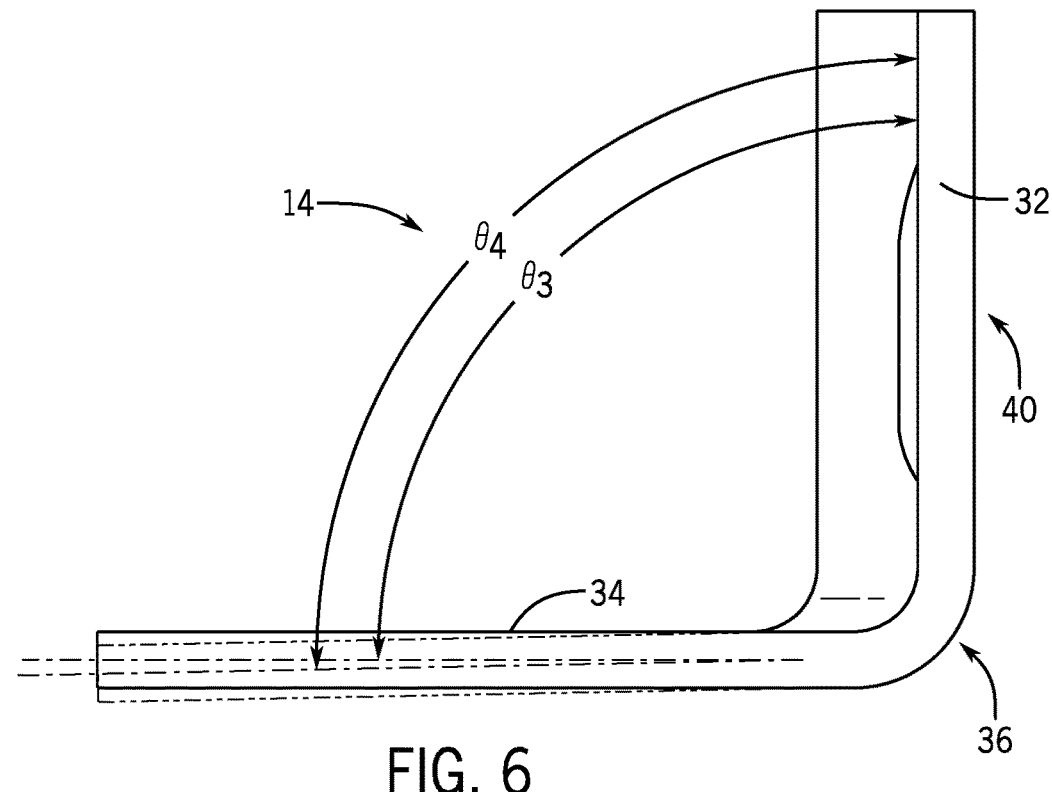
FIG. 6 is a side view showing deflection of a support bracket of the roller assembly according to the present subject matter.

Referring to FIGS. 1-7, a vehicle 2 includes a side door opening 4 in the body 48, which opening 4 can be closed by one or more sliding side doors 6. FIGS. 1-2 show two sliding doors 6, which slide in opposite directions to uncover the opening 4. The vehicle 2 may include one sliding side door 6, or two or more sliding side doors 6, sliding in different directions to uncover the opening 4. The sliding door 6 is slidably mounted via a roller assembly 8 engaged to the door 6 and to a track/rail 10 on a body 48 of the vehicle 2. The sliding side door 6 can include more than one roller assembly 8. The roller assembly 8 may be a lower roller assembly of the door 6, or may be another (e.g. middle or upper) roller assembly of the door 6. FIG. 2 shows the two doors 6 each including a lower roller assembly 8. The door 6 moves/slides between an open position (FIG. 1) in which the door 6 does not cover the opening 4, and a closed position (FIG. 2) in which the door 6 covers the opening 4. The opening 4 may be used for transmitting people or goods in or out of an interior compartment of the vehicle 2.

The roller assembly 8 has a general L-shape (see FIG. 4), and includes an L-shaped bracket 12, a support bracket 14, a roller arm 16, a roller 18, and optionally a spacer 20. The roller assembly 8 is mounted on an inside of the door 6, and engages the rail 10, and is used to laterally space the door 6 from the rest of the vehicle 2 when the door 6 is moving between the open and closed positions.

The roller assembly 8 is used to slidably connect the door 6 to the rail 10, and thus when this is done, the roller assembly 8 bears at least a portion of the load/weight of the door 6 under the effect of gravity.

1. L-Shaped Bracket 12

The L-shaped bracket 12 may include a one-piece or multi-piece construction, include various materials, and be formed by various methods. The L-shaped bracket 12 may include a one-piece stamped metal construction.

The L-shaped bracket 12 includes a vertically oriented portion 22 and a horizontally oriented portion 24 defined on either side of a bend 26. As used herein, the term "vertical" and cognate terms means straight up-and-down (i.e., plump, 90° slope) as well as other orientations diverging by up to 30° from straight up-and-down. As used herein, the term "horizontal" and cognate terms means completely level with no slope (i.e., 0° slope) as well as other orientations diverging by up to 30° from completely level. The vertically oriented portion 22 and the horizontally oriented portion 24 may each be in the general form of a plate.

The L-shaped bracket 12 may be connected to an inside 28 of the door 6 via the vertically oriented portion 22. The vertically oriented portion 22 may be connected to the door 6 via a weld, fastener, and/or adhesive, and may include various apertures for this purpose and/or for connecting with the support bracket 14, roller arm 16, or other components of the vehicle 2. The outside surface 30 of the vertically oriented portion 22 may face the inside 28 of the door 6 when they are connected to each other.

The L-shaped bracket 12 may be formed with an over-bend, such that there is an initial unloaded angle $\theta_1$ of greater than 90° between the vertically oriented portion 22 and the horizontally oriented portion 24. Therefore, before the roller assembly 8 is used to connect the door to the rail 10, i.e. when the roller assembly 8 is not under the load from the sliding side door 6, the original angle $\theta_1$ between the vertically oriented portion 22 and the horizontally oriented portion 24 of the L-shaped bracket is more than 90°, e.g. more than 91° or equal or more than 92°.

The L-shaped bracket 12 may be intended, designed, and configured to deflect under the load of the door 6 to an angle of 90°±0.5°, e.g. 89.5°-90.5° or 90°-90.5° or 90°, when supporting the load/weight of the door 6, but not to deflect to an angle of less than 90°±0.5°, e.g. not less than 90°. One or more characteristics, e.g. strength, stiffness, etc., of the L-shaped bracket 12 may be selected so as to correspond with a weight of the door 6, such that when the roller assembly 8 is under the load of the sliding side door 6, the L-shaped bracket 12 will deflect (i.e. the horizontally oriented portion 24 may deflect at the bend 26 up toward the vertically oriented portion 22) so as to have a subsequent loaded angle $\theta_2$ between the vertically oriented portion 22 and the horizontally oriented portion 24. Selecting a size, thickness, and/or material of the L-shaped bracket 12 may be used to adjust the characteristics, e.g. strength, stiffness, etc., of the L-shaped bracket 12 so as to correspond with the weight of the door 6 and thus allow for a decrease in the angle between the vertically oriented portion 22 and the horizontally oriented portion 24.

When the roller assembly 8 is used to slidably connect the door 6 to the rail 10, the L-shaped bracket 12 may deflect from the effects of the load of the door 6, which may cause the angle between the vertically oriented portion 22 and the horizontally oriented portion 24 to change from the original unloaded angle $\theta_1$ of greater than 90° to a subsequent loaded angle $\theta_2$ of 90°, e.g. the vertically oriented portion 22 and the horizontally oriented portion 24 are orthogonal.

The angles $\theta_1$ and $\theta_2$ between the vertically oriented portion 22 and the horizontally oriented portion 24 may be measured between a first plane that intersects the vertically oriented portion 22 more than any other plane intersecting the vertically oriented portion 22, and a second plane that intersects the horizontally oriented portion 24 more than any other plane intersecting the horizontally oriented portion 24. The original unloaded angle $\theta_1$ may be 92°-95°, or 92°-93°. The subsequent loaded angle $\theta_2$ may be 90°±0.5°.

2. Support Bracket 14

The support bracket 14 may include a one-piece or multi-piece construction, include various materials, and be formed by various methods. The support bracket 14 may include a one-piece stamped metal construction. The support bracket 14 may be connected to the L-shaped bracket 12 at one or more locations. The L-shaped bracket 12 may be larger than the support bracket 14. The support bracket 14 includes a vertical portion 32 and a horizontal portion 34 defined on either side of a bend 36. The vertical portion 32 and the horizontal portion 34 may each be in the general form of a plate.

The support bracket 14 may be arranged at an inside surface 38 of the L-shaped bracket 12, such that an outside surface 40 of the support bracket 14 faces, and may contact, the inside surface 38 of the L-shaped bracket 12 when they are connected to each other directly, indirectly, or both. The vertical portion 32 may be connected to the vertically oriented portion 22 of L-shaped bracket 12 via a weld, fastener, and/or adhesive, and may include various apertures for this purpose and/or for connecting with the roller arm 16, or other components of the vehicle 2. The support bracket 14 may also be connected to the L-shaped bracket 12 via a fastener 42 that passes through the horizontal portion 34 of the support bracket 14, through the roller arm 16, and into the horizontally oriented portion 24 of the L-shaped bracket 12, which also connects the roller arm 16 to the support bracket 14 and the L-shaped bracket 12. The support bracket 14 is used in conjunction with the L-shaped bracket 12 for mounting of the roller arm 16. The roller arm 16 may be arranged and secured between the support bracket 14 and the L-shaped bracket 12 with the fastener 42, which defines a joint between the support bracket 14, the L-shaped bracket 12, and the roller arm 16. The support bracket 14 may be arranged above the roller arm 16, and the L-shaped bracket 12 may be arranged below the roller arm 16.

The support bracket 14, like the L-shaped bracket 12, may be formed with an overbend, such that there is an initial unloaded angle $\theta_3$ of greater than 90° between the vertical portion 32 and the horizontal portion 34. Therefore, before the roller assembly 8 is used to connect the door to the rail 10, i.e. when the roller assembly 8 is not under the load from the sliding side door 6, the original angle $\theta_3$ between the vertical portion 32 and the horizontal portion 34 of the L-shaped bracket is more than 90°, e.g. more than 91° or equal or more than 92°.

The support bracket 14 may be intended, designed, and configured to deflect to a 90° angle when supporting the load/weight of the door 6 on the vehicle 2, but not deflect to an angle of less than 90°±0.5°, e.g. not less than 90°. One or more characteristics, e.g. strength, stiffness, etc., of the support bracket 14 may be selected so as to correspond with a weight of the door 6, such that when the roller assembly 8 is under the load from the sliding side door 6, the support bracket 14 will deflect (i.e. the horizontal portion 32 may deflect at the bend 36 up toward the vertical portion 34) so as to have a subsequent loaded angle $\theta_4$ between the vertical portion 32 and the horizontal portion 34. Selecting a size, thickness, and/or material of the support bracket 14 may be used to adjust the characteristics, e.g. strength, stiffness, etc., of the support bracket 14 so as to correspond with the weight of the door 6 and thus allow for a decrease in the angle between the vertical portion 32 and the horizontal portion 34.

When the roller assembly 8 is used to slidably connect the door 6 to the rail 10, the support bracket 14 may deflect from the effects of the load of the door 6, which may cause the angle between the vertical portion 32 and the horizontal portion 34 to change from the original unloaded angle $\theta_3$ of greater than 90° to a subsequent loaded angle $\theta_4$ of 90°, e.g. the vertical portion 32 and the horizontal portion 34 are orthogonal.

The angles $\theta_3$ and $\theta_4$ between the vertical portion 32 and the horizontal portion 34 may be measured between a first plane that intersects the vertical portion 32 more than any other plane intersecting the vertical portion 32, and a second plane that intersects the horizontal portion 34 more than any other plane intersecting the horizontal portion 34. The original unloaded angle $\theta_3$ may be 92°-95°, or 92°-93°. The subsequent loaded angle $\theta_4$ may be 90°±0.5°.

3. Roller Arm 16

The roller arm 16 may be mounted, at its proximal end 44, between the L-shaped bracket 12 and the support bracket 16, e.g. mounted between the horizontally oriented portion 24 of the L-shaped bracket 12 and the horizontal portion 34 of the support bracket 16. The roller arm 16 extends laterally/horizontally away from the L-shaped bracket 12 and the support bracket 16 and towards the vehicle body 48. When the door 6 is mounted on the vehicle, the roller arm 16 horizontally spaces the door 6 from the vehicle body 48 when the door 6 is moving between the open position and the closed position. The door 6 does not contact the vehicle body 48 during such movement.

The roller arm 16 may include a one-piece or multi-piece construction, include various materials, and be formed by various methods. The roller arm 16 may include a one-piece forged metal construction.

The roller arm 16 may be rotatably mounted at the proximal end 44 about an axis A defined by the fastener 42. The roller arm 16 may rotate around the axis A with respect to the L-shaped bracket 12 and the support bracket 14 during movement of the door 6 between the open position and the closed position. The roller arm 16 may include an aperture through which the fastener 42 is inserted for establishing the joint.

4. Roller 18

One or more rollers 18 may be mounted on a distal end 46 of the roller arm 16, which is on an end of the roller arm 16 distal from the joint defined by the fastener 42 connecting the support bracket 14, the L-shaped bracket 12, and the roller arm 16. The roller 18 may engage the rail 10 on the body 48 of the vehicle 2. The roller 18 may roll along a length of the rail 10 so as to slidably connect the door 6 to the body 48 of the vehicle 2 and allow the door 6 to move between the open position and the closed position. The roller assembly 8 may include three, or more or less, rollers 18.

5. Spacer 20

The spacer 20 may be included between the roller arm 18 under it, and the support bracket 14 above it. The spacer 20 inhibits, or prevents, the roller arm 18 from contacting the support bracket 14. The spacer 20 may be arranged in a gap between the roller arm 18 and the support bracket 14. The spacer 20 may be of a one-piece or multi-piece construction, and may be made of a material that decreases friction when the roller arm 18 moves with respect to the support bracket 14 as compared to an amount of friction that would be created if the roller arm 18 contacted the support bracket 14 during such movement.

Figure 7:
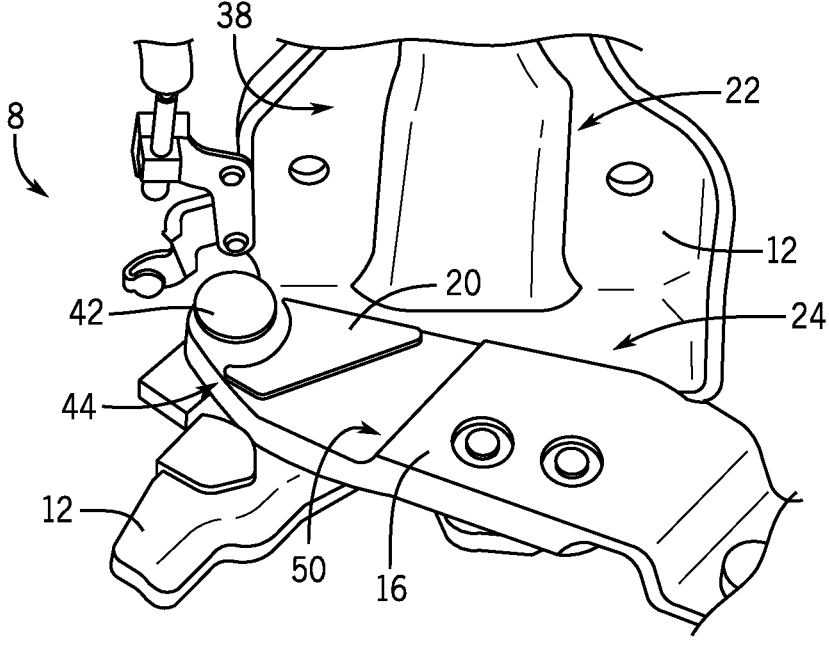
FIG. 7 is a perspective view of a part of the roller assembly of FIG. 3 without the support bracket and showing a spacer.
Figure 8:
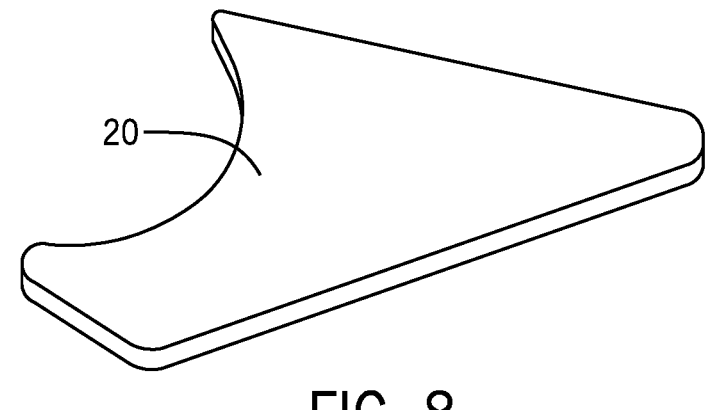
FIG. 8 is a perspective view of the spacer of FIG. 7.

The spacer 20 may have any shape. The spacer 20 may have a shape of a triangle with a partial circular cutout as shown in FIGS. 7-8, or could have other shapes. The thickness of the spacer 20 may correspond with the size of the gap between the roller arm 18 and the support bracket 14, and/or may correspond to an amount of wear expected over a lifetime of the roller assembly 8.

The spacer 20 may include various material including thermoplastics such as polyoxymethylene (POM), poly-formaldehyde, etc. The spacer 20 may have a high stiffness, low friction, and excellent dimensional stability. The spacer 20 may be formed directly on the top surface 50 of the roller arm 16, or may be formed prior to arrangement between the roller arm 18 and support bracket 14. The spacer 20 may be secured between the roller arm 18 and support bracket 14 by an adhesive, compression, by a fastener, or by self-adhesion with the roller arm 18 or support bracket 14. A second spacer 20 (not shown) may be arranged between the roller arm 16 and the L-shaped bracket 12 to inhibit or prevent the roller arm from contacting the L-shaped bracket 12.

6. Method

A method of using the roller assembly 8 may include providing the roller assembly 8, and using the roller assembly 8 to slidably connect the door 6 to the body 48 of the vehicle 2 such that the door 6 can slide between the closed position covering the door opening 4 in the body 48 of the vehicle 2, and an open position not covering the door opening 4. The angle $\theta_1$ between the vertically oriented portion 22 and the horizontally oriented portion 24 of the L-shaped bracket 12 may be more than 90°, e.g. more than 91°, before the roller assembly 8 is used to slidably connect the door 6 to the vehicle 2. The angle $\theta_2$ between the vertically oriented portion 22 and the horizontally oriented portion 24 of the L-shaped bracket 12 may be 90° after the roller assembly 8 is used to slidably connect the door 6 to the vehicle 2. The angle $\theta_3$ between the vertical portion 32 and the horizontal portion 34 of the support bracket 14 may be more than 91° before the roller assembly 8 is used to slidably connect the door 6 to the vehicle 2. The angle $\theta_2$ between the vertical portion 32 and the horizontal portion 34 of the support bracket 14 may be 90° after the roller assembly 8 is used to slidably connect the door 6 to the vehicle 2. The method may be a method of making a vehicle.

A method of making the roller assembly 8 may include providing the L-shaped bracket 12 to have the initial unloaded angle $\theta_1$ between the vertically oriented portion 22 and the horizontally oriented portion 24 of more than 90°, e.g. more than 91°, and/or preparing the support bracket 14 to have the initial unloaded angle $\theta_3$ between the vertical portion 22 and the horizontal portion 24 of more than 90°, e.g. more than 91°. The method includes joining the support bracket 14 to the L-shaped bracket 12. The method includes configuring the L-shaped bracket 12 and/or the support bracket 14 so that a characteristic (e.g. strength, stiffness, etc.) of the L-shaped bracket 12 and/or a characteristic (e.g. strength, stiffness, etc.) of the support bracket 14 correspond(s) to a weight of the door 6, such that upon bearing the load of the door 6, the subsequent loaded angle $\theta_2$ of the L-shaped bracket 12 is 90°±0.5°, and/or the subsequent loaded angle $\theta_4$ of the support bracket 14 is 90°±0.5°.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A roller assembly for a sliding side door of a vehicle, the roller assembly comprising:

an L-shaped bracket including a vertically oriented portion and horizontally oriented portion, the vertically oriented portion configured to connect to the sliding side door;

a support bracket connected to the L-shaped bracket;

a roller arm arranged between the L-shaped bracket and the support bracket, and connected at a joint to the L-shaped bracket and the support bracket; and a roller arranged on an end of the roller arm distal from the joint, the roller configured to slidably connect to a rail of the vehicle, wherein an angle between the vertically oriented portion and the horizontally oriented portion of the L-shaped bracket is more than 91° when the roller assembly is in an unloaded state and is not under load from the sliding side door, and wherein the L-shaped bracket is configured to predictably deform under the static load of the sliding side door due to a material and geometry of the L-shaped bracket such that the angle between the vertically oriented portion and the horizontally oriented portion of the L-shaped bracket changes from more than 91° in the unloaded state to approximately 90° when the roller assembly is under load from the sliding side door and thereby subject to the static load of the sliding side door.

2. The roller assembly of claim 1, wherein the angle between the vertically oriented portion and the horizontally oriented portion of the L-shaped bracket is 92°-93° when the roller assembly is not under load from the sliding side door and wherein the L-shaped bracket deflects from effects of the load of the door to change the angle from the original unloaded angle to the subsequent loaded angle.

3. The roller assembly of claim 1, further including a spacer arranged between the support bracket and the roller arm and inhibiting contact between the support bracket and the roller arm.

4. The roller assembly of claim 3, wherein the support bracket includes a vertical portion and a horizontal portion.

5. The roller assembly of claim 4, wherein the vertical portion of the support bracket contacts an inside surface of the vertically oriented portion of the L-shaped bracket, and the horizontal portion of the support bracket contacts a top surface of the spacer.

6. The roller assembly of claim 4, wherein:

an angle between the vertical portion of the support bracket and the horizontal portion of the support bracket is more than 91° when the roller assembly is not under load from the sliding side door, and the support bracket is configured such that the angle between the vertical portion of the support bracket and the horizontal portion of the support bracket is 90° when the roller assembly is under load from the sliding side door.

7. The roller assembly of claim 6, wherein the angle between the vertical portion and the horizontal portion of the support bracket is 92°-93° when the roller assembly is not under load from the sliding side door.

8. The roller assembly of claim 4, wherein the joint includes a fastener inserted through the horizontal portion of the support bracket and into the horizontally oriented portion of the L-shaped bracket.

9. The roller assembly of claim 8, wherein the fastener defines an axis around which the roller arm is able to rotate with respect to the L-shaped bracket and the support bracket.

10. The roller assembly of claim 1, wherein the roller assembly is a lower roller assembly for the sliding side door.

11. The roller assembly of claim 1, wherein the L-shaped bracket is larger than the support bracket.

12. The roller assembly of claim 1, wherein the roller arm extends horizontally away from the joint.

13. The roller assembly of claim 1, wherein the roller arm is arranged between the horizontally oriented portion of the L-shaped bracket and a horizontal portion of the support bracket.

14. The roller assembly of claim 1, wherein the support bracket is arranged on an inside surface of the L-shaped bracket.

15. A roller assembly for a sliding side door of a vehicle, the roller assembly comprising:

an L-shaped bracket including a vertically oriented portion and horizontally oriented portion, the vertically oriented portion configured to connect to the sliding side door;

a support bracket connected to the L-shaped bracket;

a roller arm arranged between the L-shaped bracket and the support bracket, and connected at a joint to the L-shaped bracket and the support bracket;

a roller arranged on an end of the roller arm distal from the joint, the roller configured to slidably connect to a rail of the vehicle; and a spacer arranged between the support bracket and the roller arm and inhibiting contact between the support bracket and the roller arm, and wherein an angle between the vertically oriented portion and the horizontally oriented portion of the L-shaped bracket is more than 91° when the roller assembly is not under load from the sliding side door, and wherein the L-shaped bracket is configured to predictably deform under the static load of the sliding side door due to a material and geometry of the L-shaped bracket such that the angle between the vertically oriented portion and the horizontally oriented portion of the L-shaped bracket changes from more than 91° in an unloaded state to approximately 90° when the roller assembly is under load from the sliding side door and thereby subject to the static load of the sliding side door.

16. A method comprising:

providing a roller assembly including an L-shaped bracket including a vertically oriented portion and horizontally oriented portion, a support bracket connected to the L-shaped bracket, a roller arm arranged between the L-shaped bracket and the support bracket, and connected at a joint to the L-shaped bracket and the support bracket, and a roller arranged on an end of the roller arm distal from the joint; and using the roller assembly to slidably connect a door to a vehicle such that the door is able to slide between a closed position covering a door opening of the vehicle, and an open position not covering the door opening, wherein an angle between the vertically oriented portion and the horizontally oriented portion of the L-shaped bracket is more than 91° before the roller assembly is used to slidably connect the door to the vehicle, and wherein the L-shaped bracket is configured, due to a material and geometry of the L-shaped bracket to predictably deform under a static load of the sliding side door such that the angle between the vertically oriented portion and the horizontally oriented portion of the L-shaped bracket changes from more than 91° in an unloaded state to approximately 90° after the roller assembly is used to slidably connect the door to the vehicle.

17. The method of claim 16, wherein the roller assembly is a lower roller assembly of the sliding side door.

18. The method of claim 16, wherein the L-shaped bracket is connected to the sliding side door, and the roller is slidably connected to a rail of the vehicle.

19. The method of claim 16, wherein:

the support bracket includes a vertical portion and a horizontal portion;

an angle between the vertical portion and the horizontal portion of the support bracket is more than 91° before the roller assembly is used to slidably connect the door to the vehicle; and the angle between the vertical portion and the horizontal portion of the support bracket is 90° after the roller assembly is used to slidably connect the door to the vehicle.

20. The method of claim 19, wherein the angle between the vertical portion and the horizontal portion of the support bracket is 92°-93° before the roller assembly is used to slidably connect the door to the vehicle.

* * * * *